April 10, 1945.    H. T. JEANDRON    2,373,313
SYNTHETIC FLYING TRAINER
Filed Aug. 11, 1941    7 Sheets-Sheet 1

Fig. 1

Inventor
Howard T. Jeandron

April 10, 1945. H. T. JEANDRON 2,373,313
SYNTHETIC FLYING TRAINER
Filed Aug. 11, 1941 7 Sheets-Sheet 2

Inventor:
Howard T. Jeandron

April 10, 1945.　　　H. T. JEANDRON　　　2,373,313
SYNTHETIC FLYING TRAINER
Filed Aug. 11, 1941　　　7 Sheets-Sheet 5

INVENTOR
Howard T. Jeandron

April 10, 1945.  H. T. JEANDRON  2,373,313
SYNTHETIC FLYING TRAINER
Filed Aug. 11, 1941   7 Sheets-Sheet 6

INVENTOR
Howard T. Jeandron

Patented Apr. 10, 1945

2,373,313

UNITED STATES PATENT OFFICE 2,373,313

SYNTHETIC FLYING TRAINER

Howard T. Jeandron, Keyport, N. J.

Application August 11, 1941, Serial No. 406,333

27 Claims. (Cl. 35—25)

This invention relates to a pilot flight training mechanism and more particularly to a device for simulating actual flight through optical illusion, which is in effect synthetic flying.

In the present state of the related art there are a number of training devices, such as the ground trainer that actually taxis around the field to give the feel of controlling the motion with aileron, flap, and rudder; then there is the trainer that remains stationary but is mounted to permit the pilot to vary his physical attitude with the respective controls; and another form permits the pilot to aim a beam of light on a target and vary his controls as the target moves; still other forms of trainers are known which are somewhat simpler and merely attempt to familiarize the trainee with the controls and their action.

Outside of the taxiing trainer, there is little chance for an optical satisfaction of the various attitudes assumed by the movement of the controls, whereas in the applicant's invention the optical illusion of motion and change in attitude has been the primary consideration, and by means of a pre-arranged sound film, a moving picture is projected upon a screen or simulated windshield which gives the optical and auditory illusion desired. To give the trainee or operator the desired control of his flight, the flying controls are co-ordinated with the projecting means and each and every response affects the attitude of the training plane. In addition, other controls and instruments are coordinated to give a very realistic effect.

The object of the present invention is to provide an optical illusion of flight by projecting a moving picture on the visual field and controlling the attitude of the picture with respect to the operator.

Another object is to provide a variable speed of projection to give the illusion of variable speed of flight.

A further object is to provide coordinated control of projection in all attitudes of flight.

A still further object is to provide electrical means of controlling the movement of the projecting means to give an optical impression of variations of physical attitude, during gunnery practice.

Another object is to provide optical aiming by flight controls to give gunnery practice.

A still further object is to produce a moving target problem by a moving picture projection with a means of aiming a gunnery sight at the target, consisting of the flying controls of an airplane.

A further object is to provide a sound film so that realistic sound effects may be had, and verbal instruction for firing a gun may be imposed on the sound film.

A still further object is to provide means of plotting the correct ballistic data for certain conditions on an imaginary path of a film and adjusting the follower circuit to register according to contacts made over this imaginary path of projection.

A still further object is to provide an airplane gunnery turret with the positioning controls and a projected target problem, with means of indicating ballistically corrected hits.

A further object is to provide visual problems for tank operation and gunnery practice.

Other objects and characteristic features of the invention will appear from the following detailed description of one embodiment thereof, taken in connection with the accompanying drawings wherein identical reference numerals are applied to the same parts in the several figures, and in which.

Figure 1:
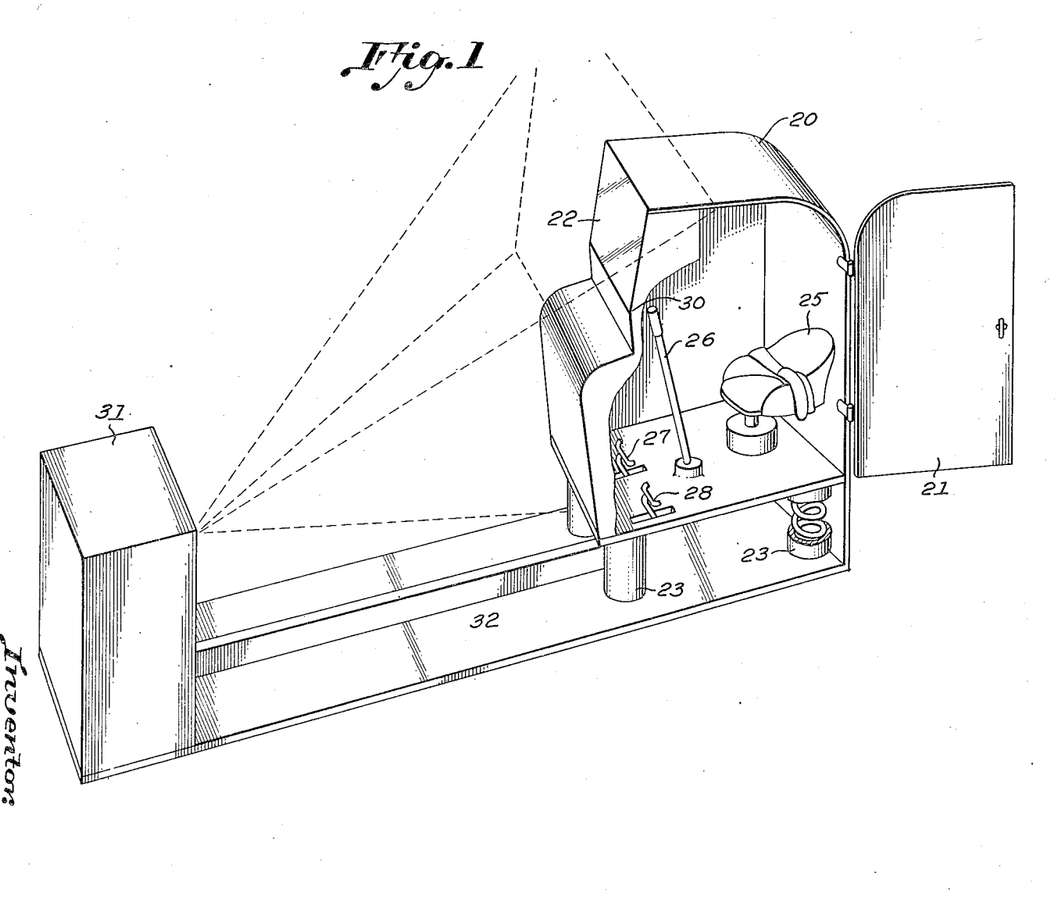
Fig. 1 is a perspective view of an airplane cockpit trainer and its associated projecting mechanism.

In the preferred embodiment illustrated in Fig. 1, there is provided a simulated cockpit enclosure 20, which for the purposes intended is shown completely enclosed with a door 21 permitting entry and exit into and out of the structure. Also, embodied in this structure, is an opening 22 covered with a screen of glass or other screen windshield material. The structure 20 may be mounted on legs or springs 23 to raise it off the ground and to give it a resilient effect, such as the landing gear of a plane. Within the structure there is provided a pilot chair 25, a stick 26, a pair of rudder pedals 27, 28 and a dash board or instrument board 30. Mounted a short distance in front of the cockpit is a projecting unit 31, which is electrically connected to the cockpit controls by a conduit means 32.

Figures 2, 3, 9, 16:
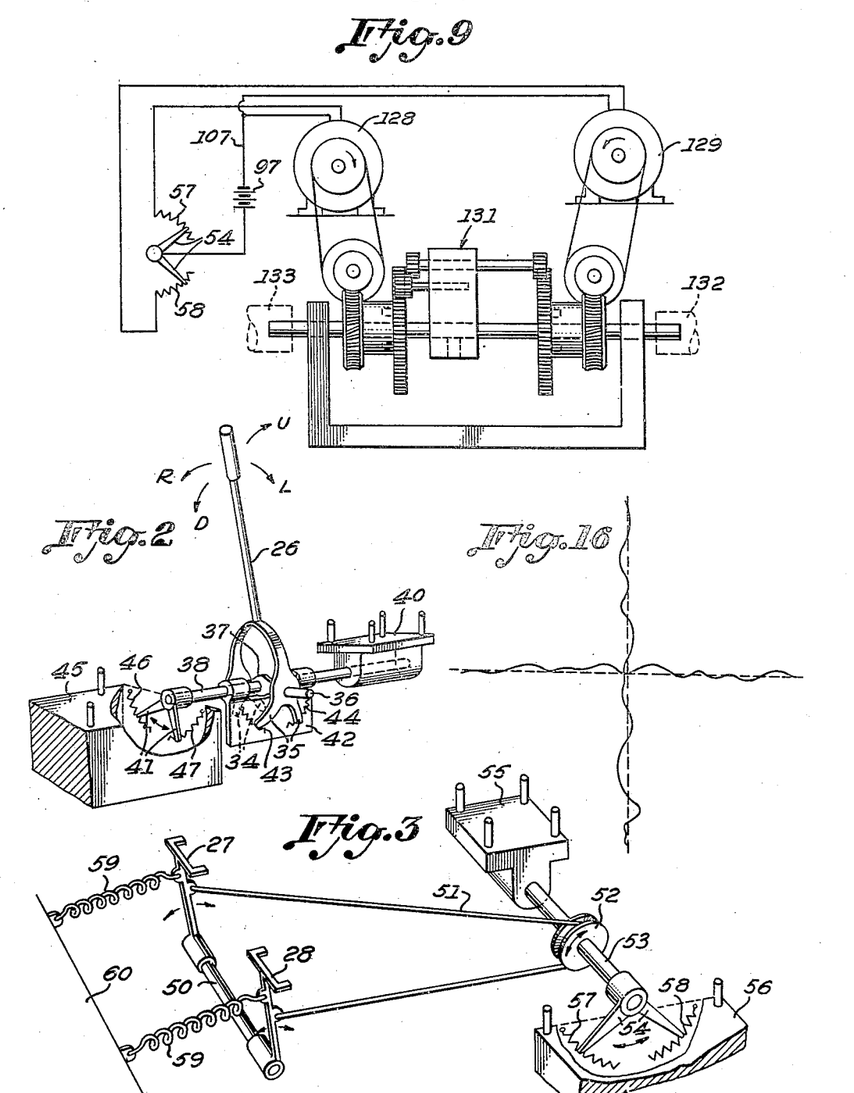
Fig. 2 is a perspective illustration of the stick control and the two rheostat controlled by the stick.
Fig. 3 is a perspective illustration of the rudder control and the rheostat controlled by the movement of the rudder pedals.
Fig. 9 is an elevational view of a pair of motors and their associated differential drive.
Fig. 16 is a graph illustrating the development of the periphery of the follower cams for gunnery practice.

The stick 26 is mounted as indicated in Fig. 2, being formed with a yoke end 33 and having two rheostat arms 34, 35. Through the center of the yoke 33 a shaft 36 is mounted, this shaft having a central portion 37 formed as a bearing so that the yoke 33 stays centered on this shaft 36, and permits the stick 26 to be pivotally moved in a plane at right angles to the axis of the shaft 36. A shaft 38 is passed through the bearing portion 37 and mounted in a large bearing 40, where it may be keyed to lock it in a fixed end wise position, but rotatable at right angles to the axis of the shaft. The shaft 38 also has mounted at the opposite end thereof a pair of rheostat arms 41. Hanging from the shaft 38 in a rheostat supporting member 42 which has two rheostats, 43 and 44, therein, and in operation are contacted by the pairs of arms 34 and 35. The bearing 40 may be mounted to the floor of the cockpit by the bolts shown in any suitable fashion to support the stick 26 in its proper relationship. In addition, a rheostat supporting member 45 is also mounted to the floor of the cockpit to properly position a pair of rheostats 46 and 47, so that the arm 41 may contact same. It is apparent that with members 40 and 45 properly affixed the stick 26 may be moved forward, back or to the right or left within a sphere of some 30 to 40 degrees; and in so doing, will move the paired contact arms 34, 35 and 41 over the rheostats 43, 44 and 46, 47 respectively to the degree that the stick 26 is moved in that plane.

Likewise, the rudder pedals 27 and 28 are mounted on a shaft 50 and both attached to a cable 51. The cable is looped about a pulley 52 which is in turn keyed to a shaft 53. Mounted on the one end of the shaft are a pair of contact arms 54, which are keyed thereto to rotate with the shaft. The shaft is mounted in and supported by a bearing 55, which may be bolted to the floor of the cockpit. Also bolted to the floor of the cockpit is a rheostat support 56 which supports a pair of rheostats 57 and 58. To insure the pedals 27 and 28 remaining in a neutral position and a balanced relationship, each pedal has a double acting spring 59 affixed thereto and to a permanent support 60. In operation, the movement of one pedal forward moves the other pedal backward and vice versa, but at the same time, any movement is translated to the pulley 52 and shaft 53, and thus to the rheostat arms 54.

Figures 4, 5, 6:
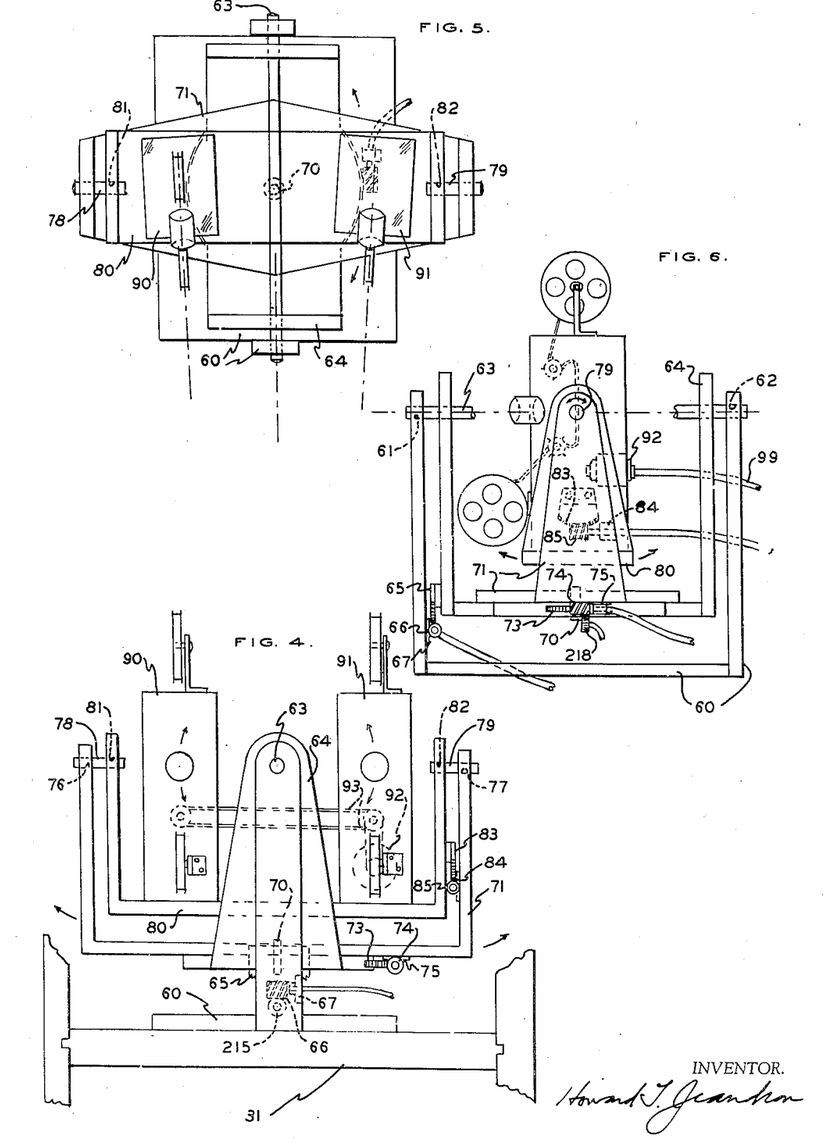
Fig. 4 is an elevational view of the projecting mechanism and its controlling motor and mounting structure.
Fig. 5 is a plan view of Fig. 4.
Fig. 6 is a side elevational view of Fig. 4.

Referring to Fig. 4, mounted within the structure 31 is a two armed supporting standard 60 which may be affixed to the structure 31. In the upper end of the two arms of the member 60 are two holes 61 and 62 which serve as bearings for a shaft 63.

Suspended from the shaft 63 is a supporting frame 64. Affixed to a lower edge of the frame 64 is an arcuate gear segment 65 whose radius is determined by the center of shaft 63. Meshing with this gear segment is a worm gear 66 which is in turn supported by a bearing 67, which is affixed to the standard of the member 60; thus, it is apparent that when the worm gear is rotated, the whole structure within the frame 64 will be moved about a pivot point, which happens to be the shaft 63. Rotation of the worm gear one way will tilt the structure 64 one way and reversing the rotation will tilt the structure in the opposite direction. This, in effect, gives a bank control action.

Pivotally mounted on a pin 70 is a supporting frame 71, which bears on the frame 64 but is rotatably positioned by means of a gear segment 73 and worm gear 74. The gear segment is affixed to the member 64 and the worm gear is mounted in a bearing 75, which is affixed to the frame 71, so that when the worm gear is rotated, the frame 71 will be moved about the pivot point 70 in either direction, depending upon the rotation of the worm gear. This, in effect, simulates a rudder control action.

The frame 71 has two holes 76 and 77 in the upper ends of each standard which serve as supports for two stub shafts 78 and 79 respectively. Pivotally mounted on these stub shafts is a frame 80 having two holes 81 and 82 in the upper end of its standards which serve as bearings to permit the frame 80 to swing in an arc about the pivotal center of the stub shafts 78 and 79. Affixed to the frame 80 is a segment gear 83 and affixed to the frame 71 is a bearing 84 which supports a worm gear 85, so that the worm gear meshes with the gear segment. When the gear 85 is rotated, the frame 80 will be moved forward or back about the pivotal point of the stub shafts to simulate an aileron control for nosing the airplane down or up.

Mounted on the frame 80 are two projectors 90 and 91 so mounted that their projection beams will merge to give superimposed images at a predetermined distance from the projectors. To insure a synchronous action of the shutters of both projectors; a single motor is used to drive both projectors by means of a chain drive 93 over the sprockets of each projector.

It is apparent that the projectors when alternated in their frames of projection will cause a superimposed projection picture without flicker. It is also obvious that the control mechanism whereon the projectors are mounted permits the projection picture to be tilted, imitating the banking action of a plane, to be turned left or right imitating the action of a rudder of an airplane, and to be nosed up or down, imitating the action of a pair of ailerons. The projectors and their accessories are a standard type of projector without any particular novel arrangement other than the single motor drive and the alternate shutter exposure operation. In some cases it is of value to provide one projector with a sound film and the necessary sound equipment to permit realistic sound effects to be used and, when necessary, verbal instructions may be used on the sound film.

Figures 7, 8:
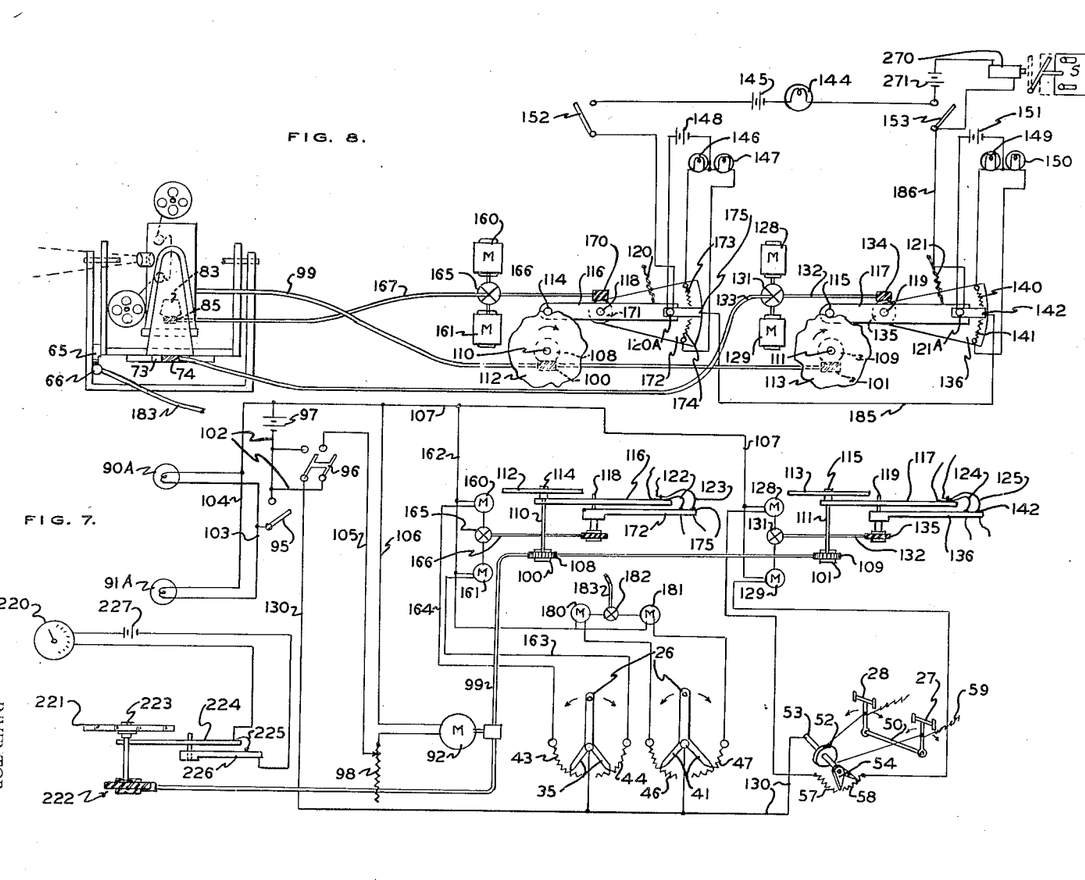
Fig. 7 is a schematic wiring diagram of the electrical controls.
Fig. 8 is a plan view of the electrical follower contacts and cams of Fig. 7.

Referring next to Figs. 7 and 8, wherein a schematic wiring diagram and drive layout of the controls is illustrated, the projector circuits and drives are comprised of a pair of projector lamps 90A and 91A, a lamp switch 95, a motor switch 96, a battery 97, a motor 92, a motor control rheostat 98, a flexible cable drive 99 with worm gears 100 and 101. The illumination and drive of the projectors may be traced by following the circuit illustrated. When the switch 95 is closed, a circuit will be completed from the battery 97 through through the lead 102 to the switch 95 through the closed switch, through the lead 103 to both lamps 90A and 91A, through these lamps, through a lead 104 back to the opposite side of the battery 97. Likewise, when the switch 96 is closed, a circuit will be completed from the battery 97 through the lead 102 to the switch 96, through the switch, through the lead 105 to the rheostat 98, through the rheostat to the motor 92, through the motor 92, through the lead 106 and lead 107, back to the opposite side of the battery 97. The speed of the motor 92 will depend upon the position of the rheostat 98, which is adjustable. This, in effect, simulates a throttle control. The worm gears 100 and 101 are meshed with gears 108 and 109 respectively; they are in turn mounted on shafts 110 and 111 and affixed thereto to drive the shafts. Mounted on these shafts are records 112 and 113 that are to be rotated by the shafts, and in addition, the records have an irregular cam periphery. Engaging the periphery of these cams are rollers 114 and 115, which are in turn mounted on crank arms 116 and 117. The crank arms are pivotally mounted on shafts 118 and 119 and by means of springs 120 and 121 they maintain the rollers 114 and 115 in contact with the periphery of the cams 112 and 113. The ends of the crank arms 116 and 117 which are away from the cams, have mounted thereon terminals 120A and 121A, which support pairs of contact fingers 122, 123 and 124, 125.

The rudder pedals and their associated rheostat controls have already been identified. Likewise, the control stick and its associated rheostats and controls have been identified, so reference is next made to the motors and drives associated with this mechanism. The rudder control rheostats 57 and 58 are connected to a pair of motors 128 and 129, while the motors are in turn connected to the battery 97 by means of the lead 107. The rheostat contact arms 54 are electrically connected through shaft 53 and lead 130 to the switch 96, and when this switch is closed, will be connected to the opposite side of the battery 97. Thus, it is apparent that pushing down on the left rudder pedal will complete a circuit from the battery 97 through switch 96, through the lead 130, shaft 53, rheostat arms 54, rheostats 57 and 58, to the motors 128 and 129. Since the motors are connected to the other side of the battery 97, they will be operated.

Referring to Fig. 9, it is apparent that both motors 128 and 129 will be operated and will be driving the differential 131. Since the differential is used to translate the drive C. C. W. or C. W. as the case may be, or to remain stationary when the two drives are balanced, then it is apparent that, (referring to Fig. 7), when the left rudder pedal is pushed down, the shaft 53 will be rotated and the contact arms 54 will be moved clockwise. This will move one arm over the rheostat 57 to reduce the resistance and the other arm over the rheostat 58 to increase the resistance, which in turn causes the motor 128 to increase its speed, and the motor 129 to decrease its speed. The motor 128, driving much faster than the motor 129, will cause the differential 131 to translate the drive in the direction of rotation of the faster motor 128.

Likewise, a similar circuit may be traced when the right rudder pedal is pushed inward, which will in turn translate a drive through the differential in the direction of the one motor 129. Since both motors are connected to a differential gear 131, then the output drive of the differential may be clockwise or counterclockwise, as the case may be. Affixed to the shaft of the differential 131 is a shaft 132, and affixed to the opposite side of the drive is a flexible shaft drive 133, so that increasing the speed of either motor 128 or 129 will have two direct effects, one being to translate the drive to the flexible shaft 133, and the other effect being to rotate the shaft 132. The effect of driving the flexible shaft 133 is to drive the worm gear 74, which meshes with the gear segment 73, which gives a rotary movement of the projector mount to simulate a rudder action. The effect of driving the shaft 132 is to drive a worm gear 134, which in turn meshes with a gear 135. Since the gear 135 is affixed to a shaft 119, and likewise has a rheostat carrying arm 136 affixed thereto, then the arm 136 will be moved right or left according to the speed of drive of motors 128 or 129. Mounted on the rheostat arm are two rheostats 140 and 141 so positioned that the contact finger 124 will make contact with either rheostat when the arm 136 or arm 117 is moved about the pivot shaft 119. Also mounted on the arm 136 is a central contact 142 so positioned that when the arm 117 is centrally positioned over the arm 136, the finger 125 will make contact with the contact 142.

In similar fashion, the aileron control rheostats 43 and 44 are connected to a pair of motors 160 and 161, while the motors are in turn connected to the battery 97 by means of the leads 162 and 107. The rheostat contact arms 35 are connected through a lead 130 to the switch 96, and when this switch is closed, will be connected to the opposite side of the battery 97. Thus, it is obvious that moving the stick forward to nose down the airplane will complete a circuit from the battery 97 through the switch 96, through the lead 130, rheostat arms 35, rheostats 44 and 43, leads 163 and 164, to the motors 160 and 161. Since the resistance to motor 161 is reduced, the motor will speed up and the differential 165 will be driven in this direction. Likewise, a similar circuit may be traced when the stick is moved rearward to nose up the airplane, which in turn, operates the motor 160. Since both motors will be operated at the same time, both motors are connected to a differential gear 165, so that the motor producing the greater input drive to the differential will produce a clockwise or counterclockwise drive as the case may be. Affixed to one end of the differential 165 is a shaft 166, and affixed to the opposite side is a flexible shaft 167, so that acceleration of either motor 160 or 161 will have a direct effect on the differential, rotating the differential with the accelerated gear which translates the drive to the shaft, and so to the flexible shaft 167 and the shaft 166. The effect of driving the flexible shaft 167 is to drive the worm gear 85, which meshes with the gear segment 83, which gives a rocking movement of the projector mount to simulate the nosing up or down of the airplane under the aileron control. The effect of driving the shaft 166 is to drive a worm gear 170, which in turn meshes with a gear 171; since the gear is affixed to a shaft 118 and likewise, has a rheostat carrying arm 172 affixed thereto, then the arm 172 will be moved right or left, according to the drive of motors 160 or 161. Mounted on the rheostat arm are two rheostats 173 and 174 so positioned that the contact finger 122 will make contact with either rheostat when the arm 172 or arm 116 is moved about the pivot shaft 118. Also mounted on the arm 172 is a control contact 175 so positioned that when the arm 116 is centrally positioned over the arm 172, the finger 123 will make contact with the contact 175.

Referring to the bank control rheostats 46 and 47, which are connected to a pair of motors 180 and 181, while the motors are in turn connected to the battery 97 by means of the leads 162 and 107, the rheostat contact arms 41 are connected through lead 130 to the switch 96, and when this switch is closed, will be connected to the opposite side of the battery 97. And so it is apparent that moving the stick 26 to the right or left to simulate a banking action will complete a circuit, through the motors 180 and 181, accelerating one or the other as the case may be. Since both motors are connected to a differential 182 and both motors may drive through the differential, then the flexible cable 183 which is attached to the shaft of the differential will be driven clockwise or counterclockwise, depending upon which motor is accelerated. The flexible shaft 183 in turn drives the worm gear 66, which meshes with the gear segment 65, which gives a tilting effect to the projector mount, to simulate a banking action either to the left or right, as the case may be.

The circuit at this point may be followed by reference to Fig. 8 wherein a target light 144, a battery 145, a switch 152, a switch 153, a pair of spotting lights 146, 147 and battery 151 are the means of indicating the various positions of aiming during gunnery practice, as well as actual hits made.

A direct hit is indicated by the lamp 144; this means that the airplane controls are correctly positioned, with a computed ballistic correction induced by the cams 112 and 113, and the target is in range as pre-analyzed in the film to close the switch 152 by means of the film notch. The circuit may be traced from one side of the battery 145 through the switch 152 to the terminal 120A, through the contact finger 123, to the contact 175, through a lead 185 to the contact 142, through the contact finger 125, to the terminal 121A, through a lead 186 to the switch 153, through this switch to the lamp 144 and the opposite lead of the lamp is in turn connected to the other side of the battery 145. In the event the gunner is aiming his airplane incorrectly, the direction in which he is out of phase will be indicated by the lamps 146 and 147, if down or up; or the lamps 149 and 150 if right or left. The degree of illumination of these lamps will indicate the amount of out of phase the controls are with relation to the correct line of flight. When any one or two of the lamps are dimly lighted, that would indicate a slight error, but in the event any one or two lamps are brightly lighted, that would indicate a great error.

Assuming the film has been analyzed for range so that notches appear on one side of the film wherever the target is in range, and the ballistics have been computed so that the degree of aim above, below, to the right or to the left of the target for a hit is known, the degree of aim up or down, right or left is controlled by the cams 112 and 113. This is done by plotting two lines one horizontal and one parallel, for the complete length of the film to be projected as indicated in Fig. 17. If the aim for a hit remained constant, then the airplane could be aimed directly on the target as indicated by the dotted lines in this figure, but due to the speed of flight, the direction of approach and other ballistic factors, it is necessary to aim the airplane for gunnery a small degree above or below the target or to the right or left of the target. This is indicated by the wavy lines in Fig. 17. These lines are transposed to the irregular faced cams 112 and 113. Referring to Fig. 8, it is apparent that the movement of the rollers 114 and 115 along these irregular cam faces will cause the arms 116 and 117 to be moved pivotally to the right and left as the case may be. Since the arms 136 and 172 are moved by the rudder and aileron controls, then it is necessary to move the arms 136 and 172 to the same degree in unison with the movement of the arms 116 and 117 to obtain ballistically corrected hits. In the event the aiming is high or low or left or right, the two arms 117 and 136 or the two arms 116 and 172 will not be in phase and an off target circuit will be completed. For example, assuming the aileron control has been carried too far down and the motor 161 has driven through the differential, shaft, and gears to move the arm 172 too far down, this will complete a circuit which may be followed from the battery 148 to the terminal 120A on through the contact finger 122, through the rheostat 173 to the lamp 146 and through this lamp back to the other side of the battery 148. Thus the lamp 146 will indicate that the aileron control has been used to nose the airplane too far down to give a hit according to the computed point for that particular shot or shots, and the degree of illumination will indicate how far out of phase the control is. Other similar circuits may be followed to indicate the error in aim of the airplane, permitting a correction before firing which will train the gunner to familiarize himself with the necessity of and degree of ballistic correction needed. The means of gunnery indication described is incidental to the actual flight controls, but the flight controls are absolutely essential to make the gunnery practice possible.

Although the stick and rudder pedals are the only controls necessary for maneuvering the projector mount to simulate flight control, yet to properly coordinate other instrument controls and incidental conections, there is provided a dash mount whereon a group of simulated instruments are mounted, such as an air speed meter 200, a bank indicator 201, an R. P. M. meter 202, an ignition switch 203, a brake control 204, and a group of other dummy instruments to give a realistic effect. Another dummy installation is a two way radio 210 in which the tuning means 211 permits picking up one of a number of telephone connections. An amplifying dial 212 permits regulation of the volume tone, plugs 213 permit the head set to be connected and a switch 214 is provided to turn the set on or off. Other dials or controls may be added for microphone and modulation for sending. The pluratliy of telephone connections are to provide two way communication between planes, airports, and other stations. A throttle 82A is provided and, as already indicated in Fig. 7, provides the variable resistance control for the projector motor, thus regulating the speed of projection of the moving picture. In the event the instrument indications are desirous, various connections are plausible and will be described briefly herein. Installing an operable air speed meter at 200, Fig. 12, requires an actuating means. This may be provided by a small Pitot tube inserted in front of the air cooling fan of the projecting motor 92 and then adjusted to register approximately the speed simulated on the projected picture. Likewise, the R. P. M. meter 202 may be operable and the drive provided by a connection to the projection motor 92. A real bank indicator may be installed at 201 and connected by flexible cable to the projector mount, where it will be operated by a worm driven gear 215, Fig. 4. The bank indicator, in addition to the needle indicating the relative position of the axis of the wings from a horizontal axis, also has a ball indicator to indicate side slip. Since side slip of the airplane will vary with each projection problem, and each problem requires a certain attitude, it is essential to compute the movement of the ball for each case and set this problem on a cam as in Fig. 8 to operate this meter.

A landing gear retracting lever 216 may also be provided and flap or tab operating controls 217 may also be installed. The operation of the levers 216 and 217 may be indicated outside the cockpit or may be indicated directly on the dash by small red and green lamps 218. A compass may be simulated by installing a ball meter at 217 and controlling its movement by a flexible cable connected to a worm driven gear 218, which meshes with the gear 74, Fig. 6; this ball meter should be set before flight to start on a given dictum line. A rate of climb meter or altimeter may be installed at 220, Fig. 12, and this should be controlled by the film. This may be accomplished by a simple analysis of the film for approximate altitude and a graph curve drawn for changes in altitude. As already described in the gunner device, this graph curve may be transferred to a disc 221 and the disc driven by a flexible cable and worm drive 222 in conjunction with the projection motor 92. A follower 223 tracing the contour of this disc would move an arm 224 and contact 225 over a rheostat 226 which is in the circuit of the meter. Thus, the movement of the contact 225 over the rheostat 226 would determine the current flow from the battery 227 and, therefore, the reading on the meter 220.

Figure 12:
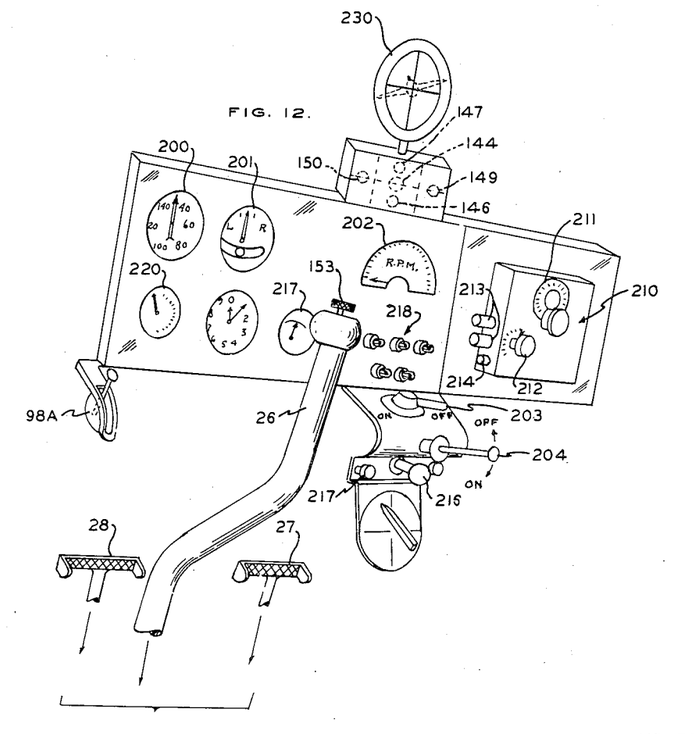
Fig. 12 is an instrument control panel indicating the various controls as well as the control stick and rudder pedals.

Figure 1 has been illustrated without a gunsight because one embodiment of this invention discloses a training unit for flying instruction, whereas Fig. 12 illustrates the controls and instruments for a trainer and includes a gunsight 230 which becomes a part of another embodiment of this invention. In this latter embodiment, the gunsight 230 is mounted on the spotting board so that sighting and spotting shots are coordinated. The gun sight may be mounted on the correct line of sight of the gunner or pilot, and may be moved forward or back for exact position, but the spotting board should be kept in close relationship for easy vision while aiming and firing.

Figure 10:
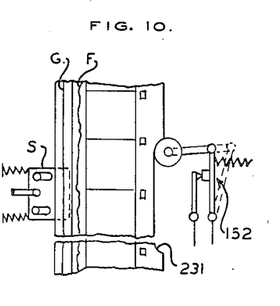
Fig. 10 is an illustration of a portion of film, showing the notch and roller actuated switch.
Figure 11:
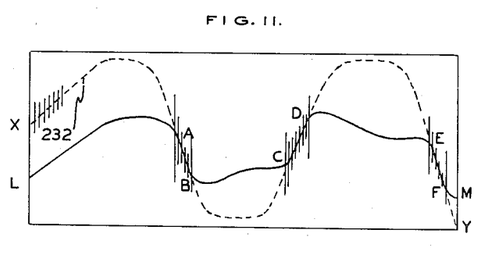
Fig. 11 is an imaginary path of positions at which a target plane may be sighted on a screen, and particular positions at which the target will be in range.

In Fig. 12 the control stick 26 has a switch 153 mounted on its extreme end for firing the shots. This is the same switch as indicated in Fig. 8. The other switch 152 of this circuit is a range switch indicated also in Fig. 10. This is controlled by notches 231 in one of the films. Notches are preformed or cut in the film whenever a target is within the range of the guns, as predetermined on the film. Referring to Fig. 11, there is an imaginary path 232 of dots which start at X when the projection starts and finishes at Y with the area between divided into the number of frames in the length of film used. Assuming that the airplane may be aimed at a target along this imaginary line, if the target were in range, then hits could be scored all along this line. Since the target is not continually in range, then the film must be plotted for the frames showing the target in range. These areas are the particular sections where the notches 231, Fig. 10 are formed. It is apparent in Fig. 11 that if the airplane is aimed correctly according to the trace X to Y, then hits can be made between AB, CD, and EF, assuming that the target falls into and out of range as indicated by the solid line L to M.

Referring to Fig. 10 which illustrates a section of film, the sound tracks F and G are indicated. The F sound tract is the normal mixed sounds of the airplane motor and noises, while the G sound track is the gun chatter. The F track is open at all times and is a predetermined sound for the complete projection, but the G track is normally closed by a shutter S and remains silent except for the few periods of actuation by the gun firing switch 153, Fig. 8. As may be seen in Fig. 8, the closing of switch 153 energizes a relay 270 by means of a battery 271; the relay in turn pulls the shutter S to the left in the Figs. 8 and 10. This opens the sound tract G allowing the recording thereon to be picked up and transformed into a noisy gun chatter on the speaker of the set. The shutter S will immediately close due to spring pressure whenever the relay 270 is de-energized. Thus it is apparent that actuation of the gun firing switch will cause an immediate noisy gun chatter which ceases when the switch is released.

Having described the various parts and their relationship, it is obvious that problems too numerous to relate may be set up and directed through the medium of the sound film, which give any desired training from simple forms of flying to difficult dog fight angles of attack and defense. By way of example, referring to Fig. 1, the mechanism illustrated is sufficient to train pilots in simple take off and landing as well as elemental movements of the airplane in the air. A further step in training pilots might include many of the instruments indicated in Fig. 12, permitting advanced training of all types or more specifically, problems in which the pilot must know the R. P. M. of his motor, air speed, altitude, direction of flight, the attitude of his airplane, etc. A still further step in training pilots for gunnery practice might include all the features illustrated in Fig. 12 and Fig. 1.

Figures 13, 14:
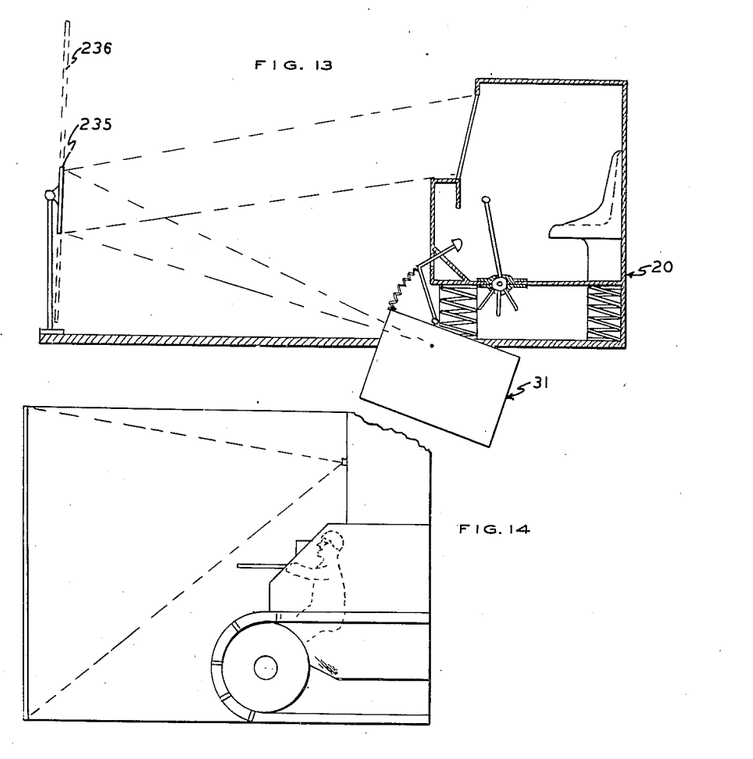
Fig. 13 is an alternate scheme of mounting the projecting unit.
Fig. 14 is an outline illustration of a projecting unit similar to that of Fig. 2, which is coordinated with a tank model.

An alternate form of arrangement for projection is illustrated in Fig. 13 wherein the projection mechanism 31 is positioned below or near the cockpit 20 and a mirror 235 is used to effect the picture on the windshild 22, or in another form the mirror mount is used for a screen 236 on which the movie is projected.

Although all previous embodiments depend upon the movement of the projectors to simulate changes in attitude of the airplane, it is possible to affix the projectors in one plane for rudder movement alone, and move the cockpit in a banking attitude or a climb or dive attitude, or combinations of both movements to give greater latitude of movement.

A still further embodiment of this invention illustrated in Fig. 14 contemplates the installation of the same projecting control with a dummy tank, wherein the movement will be in one plane and the gunnery control will be affixed to one gun for manual movement of the gun.

Figure 15:
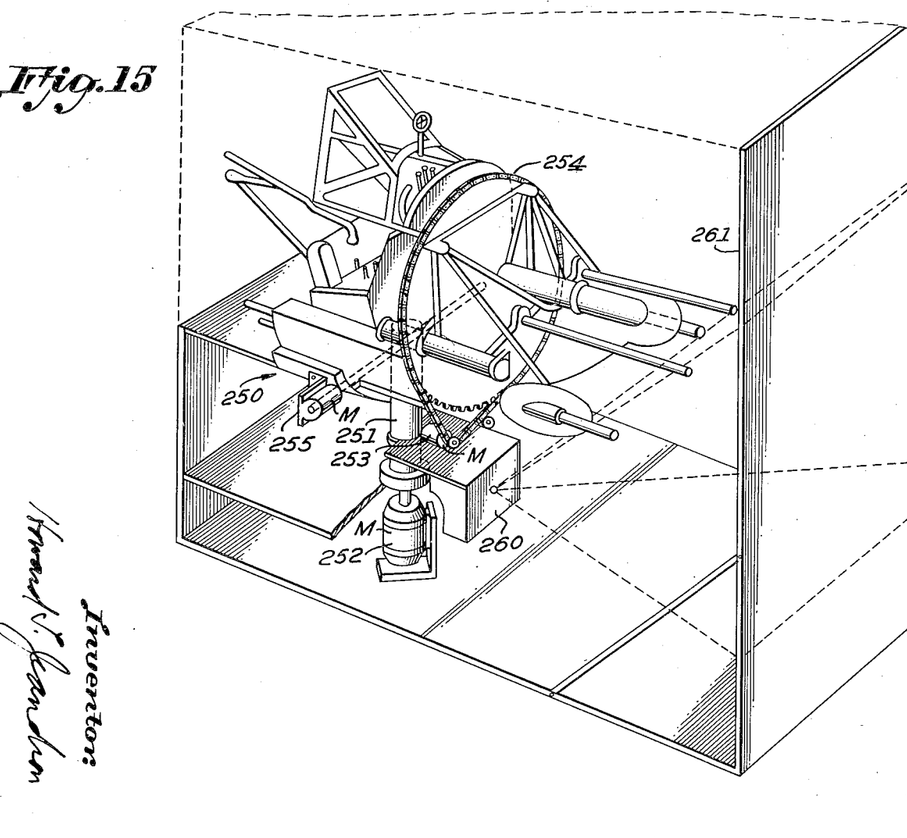
Fig. 15 is another embodiment of the invention which illustrates a movable gunnery position for an airplane having electrical controlling mechanism and a projecting unit associated therewith.

A further embodiment of the invention contemplates a gun turret position Fig. 15, wherein a plurality of machine guns are mounted to be rotated or moved with the gunner under his control. In this embodiment the whole assembly 250 is mounted on a shaft 251 and is rotated clockwise or counterclockwise by a reversible motor 252. Banking movement is accomplished by a reversible motor 253 which drives a chain on the periphery 254 of the turret mount. The gun turret may be moved up or down in angular aim by the reversible motor 255 which drives the shaft 256 to position the whole turret. The projector 260 may be mounted on the shaft 251 or affixed in a stationary position as the case may be, and a screen 261 is provided for projection. The gunnery mechanism which has been described for the airplane can be installed in the same manner on the turret unit providing a spotting board for training purposes.

Having described the various mechanisms that go to make up this invention and some of the forms of embodiment which amplify the various uses, the disclosure given is not by way of limitation, but may be altered or varied to accomplish the same results and is only limited by the appended claims.

What is claimed is:

1. An airplane trainer which comprises, in combination, dummy controls of an airplane including means to simulate the firing of a fixed gun or a plurality of fixed guns from said airplane, a gunsight, a projector to project a moving image, means responsive to the movement of said dummy controls to displace said projector relative to said screen in horizontal as well as vertical direction and to vary its inclination, means responsive to the actuation of said firing means to provide a firing sound effect.

2. An airplane trainer which comprises, in combination, dummy controls of an airplane including rudder and pedal controls and further including means for simulating the firing of a fixed gun or a plurality of guns from the said airplane trainer, a gunsight, a projector to project a moving picture upon a screen in said trainer, means responsive to the movements of said dummy controls to move said field of vision in horizontal as well as in vertical direction and to vary its inclination, and means responsive to the actuation of said firing means to signal a hit or a miss.

3. An airplane trainer which comprises, in combination, dummy controls of an airplane including rudder and pedal controls and further including means to simulate the firing of a fixed gun or a plurality of fixed guns from the said airplane, a gunsight, a projector to project a moving picture upon a screen associated with said trainer, means responsive to the movements of said dummy controls to move said projector so that the projected image on said screen is moved in both horizontal and vertical direction as well as varying its inclination and means responsive to the actuation of said firing means to signal a hit or a miss and to open said sound track to provide the sound of firing.

4. In a gunnery trainer which comprises, in combination, dummy controls and means for simulating the firing of a gun, a gunsight, a projector to project a moving picture film upon a screen, means to indicate the correct points on said film as projected at which a hit upon a target may be made, means responsive to the said dummy controls to move said gunsight and gun with respect to said screen in both horizontal and vertical direction, and means responsive to the actuation of said firing means to signal where the shots would hit with relation to the target.

5. In a gunnery trainer which comprises, in combination, dummy controls and means for simulation the firing of a gun, a gunsight, a projector to project a moving image, means to indicate the correct points in said projection at which a hit upon the said image may be made, means responsive to the said dummy controls to move said gunsight and gun with respect to said projected image in both horizontal and vertical direction, and means responsive to the actuation of said firing means to signal where the shots would hit with relation to the projected image.

6. An airplane trainer which includes, in combination, controls simulating the controls of an airplane, means including a gunsight for use in simulating the firing of a gun from the said airplane, a projector mounted for universal articulation to project a moving picture upon a screen, means responsive to the movements of said controls to cause relative displacement of the image on said screen and means responsive to the actuation of said simulated firing means to signal a hit.

7. An airplane trainer which includes, in combination, controls simulating the controls of an airplane, means including a gunsight for use in simulating the firing of a gun, a projector to project a moving picture upon a screen, means responsive to the movements of said controls to displace the picture produced by said projector with respect to said screen, and means responsive to the actuation of said simulated firing means to signal a hit, a miss, and the direction and degree of each miss.

8. An airplane trainer which includes, in combination, controls simulating those of an airplane, means for simulating the firing of a gun, a projector to project a moving picture upon a screen, means responsive to the movements of said controls to displace the picture produced by said projector with respect to said screen, a plurality of lamps visible to the operator, and mechanism to cause at least one of said lamps to be illuminated when said simulated firing means are actuated, said last-mentioned mechanism including means pre-arranged to illuminate one of said lamps when the position of said projector corresponds to the position it should be in to register a hit, and further adapted to illuminate at least one of the remaining lamps with variable intensity if the position of said projector corresponds to a miss, the location of the last mentioned lamps being disposed to indicate the direction of the miss and the intensity of illumination being proportional to the degree of the miss.

9. An airplane trainer which includes, in combination, controls simulating those which control the movements of an airplane, means including a gunsight to simulate the firing of a gun on the said airplane, a projector to project a moving picture upon a screen associated with said trainer, means responsive to the movements of said controls to move said projector to displace the picture with respect to said screen, signal means including mechanism to provide sound, and means responsive to the actuation of said simulated firing means to cause said signal means to function.

10. An airplane trainer which includes, in combination, controls simulating those of an airplane, means including a gunsight to simulate the firing of a gun from said airplane, a projector including a film to project a moving picture upon a screen, means responsive to the movement of said controls to cause relative displacement of the image on said screen, and means controlled by the film to produce appropriate sounds.

11. A gunnery trainer which comprises, in combination, controls simulating those of a vehicle and means including a gunsight for use in simulating the firing of a gun mounted on the vehicle, a projector to project a moving picture upon a screen, means responsive to the movement of said controls to move said projector at its point of articulation and thus to shift the picture produced thereby with respect to said screen, and means responsive to the actuation of said simulated firing means, to signal a hit or miss.

12. A gunnery trainer which comprises, in combination, controls simulating those of a vehicle and means including a gunsight and switch for use in simulating the firing of a gun mounted on a vehicle, a projector to project the image of a moving picture upon a screen, means responsive to the movement of said controls to displace said projector and thus shift the image produced thereby with respect to said screen, means to produce the sound of firing, a signalling means responsive to the actuation of said simulated switch firing means to cause said signalling means to indicate a hit or a miss and to cause said sound means to function.

13. An airplane trainer which includes, in combination, a windshield, manually actuated controls simulating the controls of an airplane, and means including a gunsight for use in simulating the firing of a gun, a projector to project a moving picture image of greater dimensions than said windshield in the plane of said windshield, means responsive to the movements of said controls for shifting the optic axis of the projector to cause relative displacement between the image produced by the projector and said windshield, and means responsive to the actuation of said simulated firing means to signal a hit, a miss, and the direction and degree of each miss.

14. A gunnery trainer which comprises, in combination, means used to simulate the firing of a gun, a projector to project a moving image on a screen, means to limit the field of vision on the screen, means to move the projector and thus shift the projected image with respect to said limited field of vision, and means responsive to the actuation of said first named means to signal a hit or a miss.

15. A gunnery trainer which comprises, in combination, means used to simulate the firing of a gun, a projector including a film to project a moving picture upon a screen, cam means defining a record of a plurality of ballistically correct points at which a hit may be made on the picture, control means to move said projector to shift the picture with respect to said screen, means to produce appropriate sounds, and means responsive to the operation of said control means to initiate a path of simulated flight and means responsive to said simulated firing means to produce a signal to indicate a hit.

16. In a gunnery trainer which comprises, in combination, controls simulating the controls of an airplane and means used to simulate the firing of a gun, a gunsight, a projector to project a moving picture film upon a screen, means to predetermine a given path of a target on said film to define a given path of the image as projected at which a hit upon the target may be made, means responsive to the said controls to cause relative movement between said gunsight and the image on said screen, and means responsive to the continued operation of said controls to initiate a path of simulated flight and actuation of the means to simulate firing to signal where the shots would hit with relation to the target.

17. In a gunnery trainer which comprises, in combination, controls and means used to simulate the firing of a gun, a gunsight, a projector to project a moving picture film of a moving target upon a screen, means to indicate the correct points on said film as projected at which a hit upon the target may be made, means responsive to the said controls to cause relative movement between said gunsight and the image on said screen in both horizontal and vertical direction, means responsive to the actuation of said means to simulate firing to signal where the shots would hit with relation to the target on said film.

18. In a gunnery trainer which comprises, in combination, controls and means used to simulate the firing of a gun, a gunsight, a projector to project a moving image upon a screen, means to indicate the correct points on said screen at which a hit upon the said image may be made, means responsive to the said controls to cause relative movement between said gunsight and the projected image on the screen, and means responsive to the actuation of said means to simulate firing to signal where the shots would hit with relation to the projected image on the screen.

19. In a gunnery trainer which comprises, in combination means including a gunsight used to simulate the firing of a gun, a projector to project a moving picture film upon a screen, memory means to retain a record of the correct points on said film as projected at which a hit upon said picture may be made, means responsive to the said controls to cause relative movement between said gunsight and the picture on said screen, and means responsive to the actuation of said means to simulate firing to signal a hit, a miss and the direction and degree of each miss.

20. In a gunnery trainer which comprises, in combination, controls and means including a gunsight used to simulate the firing of a gun, a projector to project a moving picture film with a target upon a screen, memory means to retain a record of the correct points on said film as projected at which a hit or a miss upon said target may be made, means responsive to the said controls to cause relative movement between said gunsight and the target on said screen, and means responsive to the actuation of said means to simulate firing to signal a hit or a miss when the target is in range with said simulated firing means.

21. In a device of the class described, the combination of a projector mounted for universal articulation and disposed to produce a moving picture image on a screen, mechanism for articulating the projector to shift the position of the image on the screen, a sighting device fixed relative to and having its optic axis pointing towards the screen, means forming a control station including a set of controls simulating airplane controls operatively connected to said projector, articulating mechanism to effect a shifting at will of the image on the screen relative to the optic axis of the sighting device and a signaling device including a manually operable control, said control and sighting device being accessible to the operator at the control station.

22. In a device of the class described, the combination of a projector mounted for universal articulation and disposed to produce a moving picture image on a screen, mechanism for articulating the projector to shift the position of the image on the screen, a sighting device fixed relative to and having its optic axis pointing towards the screen, means forming a control station including a set of controls to simulate airplane controls operatively connected to said mechanism to effect a shifting at will of the image on the screen relative to the optic axis of the sighting device, an electric notice impelling device including two control switches operatively connected to function on the closing of the switches, one of said switches controlled automatically by the shifting of the projector into a position having a pre-fixed relation between the optic axis of the projector and the optic axis of the sighting device, and the other switch being adapted to be manually actuated.

23. A film with succeeding frames having a target on each frame, a point on each frame at which a gun should be aimed to attain a hit on said target and the path of the points on the succeeding frames defining a curve, a template corresponding to the curve of the said path relative to a line of reference through the film and a cam to correspond to the contour of the template.

24. An apparatus for teaching aerial gunning including a projector and a film to be projected, said film comprised of a plurality of frames, a pair of cam controls driven by the projector, controls and means used to simulate firing including a gunsight, a plurality of points on said film that when projected on a screen form an image at which the simulated firing means must be aimed to obtain a hit, a line through said plurality of points on said film, a vertical template whose contour corresponds to the deviation of said line from a central vertical axis of each frame of said film, a horizontal template whose contour corresponds to the deviation of said line from a central horizontal axis of each frame of said film, the operative face of one cam corresponding to the contour of said vertical template and the operative face of the other cam corresponding to the contour of said horizontal template.

25. An apparatus for teaching aerial gunning including a projector and a film to be projected, said film comprised of a plurality of frames, a pair of cam controls driven by the projector, controls and means used to simulate firing including a gunsight, a facsimile of the film, a plurality of points on said facsimile corresponding to a plurality of imaginary spots on said film that when projected on a screen are the points at which the simulated firing means must be aimed to obtain a hit, a line through said plurality of points on said facsimile, a vertical template whose contour corresponds to the deviation of said line from a central vertical axis of each frame of said film, a horizontal template whose contour corresponds to the deviation of said line from a central horizontal axis of each frame of said film, the operating face of one cam corresponding to the contour of said vertical template and the operative face of the cam corresponding to the contour of said horizontal template.

26. In an apparatus including a moving picture the means to teach the aiming point on the projected picture at which a hit may be made, said means including the combination of two motors operatively connected to a differential, a worm driven lever supporting a contact of an electric circuit, said worm connected to said differential to be driven clockwise or counter-clockwise depending upon the relative speed of the two driving motors, said lever being pivotally moved either side of a central reference point depending upon the direction of rotation of said worm, a motor driven cam and second lever with a roller that is spring pressed against said cam to follow its contour, said second lever being pivotally mounted to align with the first lever at the said central reference point and having a contact point positioned to touch the contact of the first lever, said second lever being pivotally moved either side of said central reference point by the said roller, means to maintain the position of the first lever in alignment with the second lever during the rotation of the said motor driven cam so that the contacts on both levers touch to complete an electric circuit.

27. Apparatus similar to claim 26 in which there are two differentials and two worm driven levers and in which there are included two motor driven cams that are driven by a single motor, each motor driven cam having a different contour and means to control the rotation of each worm gear to maintain the position of each first lever in alignment with each second lever during the rotation of the said motor driven cams so that the contacts of both first and second levers complete a circuit.

HOWARD T. JEANDRON.